US010528882B2

(12) United States Patent
Chu et al.

(10) Patent No.: US 10,528,882 B2
(45) Date of Patent: Jan. 7, 2020

(54) AUTOMATED SELECTION OF GENERALIZED LINEAR MODEL COMPONENTS FOR BUSINESS INTELLIGENCE ANALYTICS

(71) Applicant: International Business Machines Corporation, Armonk, NY (US)

(72) Inventors: Yea Jane Chu, Chicago, IL (US); Jing-Yun Shyr, Naperville, IL (US); Weicai Zhong, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 623 days.

(21) Appl. No.: 14/788,378

(22) Filed: Jun. 30, 2015

(65) Prior Publication Data

US 2017/0004409 A1 Jan. 5, 2017

(51) Int. Cl.
*G06F 17/18* (2006.01)
*G06N 7/00* (2006.01)

(52) U.S. Cl.
CPC ............ *G06N 7/005* (2013.01); *G06F 17/18* (2013.01)

(58) Field of Classification Search
CPC ........ G06N 7/005; G06N 99/005; G06N 3/08; G06F 17/18
See application file for complete search history.

(56) References Cited

U.S. PATENT DOCUMENTS 8,521,663 B1 8/2013 Phillips et al.
2003/0014378 A1 1/2003 Goodnight et al.
(Continued)

FOREIGN PATENT DOCUMENTS

WO 03076895 A1 9/2003
WO 03085493 A2 10/2003
WO 2013177751 A1 12/2013

OTHER PUBLICATIONS

Benjamin M. Bolker, Mollie E. Brooks, Connie J. Clark, Shane W. Geange, John R. Poulsen, M. Henry H. Stevens and Jada-Simone S. White, "Generalized linear mixed models: a practical guide for ecology and evolution", Mar. 2009, Trends in Ecology & Evolution, vol. 24 Issue 3, pp. 127-135.*

(Continued)

*Primary Examiner* — Kamran Afshar
*Assistant Examiner* — Ying Yu Chen
(74) *Attorney, Agent, or Firm* — Shumaker & Sieffert, P.A.

(57) ABSTRACT

Techniques are described for automated selection of components for a generalized linear model. In one example, a method includes determining a candidate set of distributions, a candidate set of link functions, and a candidate set of predictor variables, based at least in part on a dataset of interest. The method further includes selecting a distribution from the initial candidate set of distributions and a link function from the initial candidate set of link functions, based at least in part on the candidate set of predictor variables; and selecting predictor variables from the candidate set of predictor variables, based at least in part on the selected distribution and the selected link function. The method further includes reiterating the selecting processes until a stopping criterion is fulfilled, and generating a generalized linear model output comprising the selected distribution, the selected link function, and the selected predictor variables.

11 Claims, 6 Drawing Sheets

(56) References Cited

U.S. PATENT DOCUMENTS

| | | | |
|---|---|---|---|
| 2005/0234698 A1 | 10/2005 | Pinto et al. | |
| 2007/0016542 A1* | 1/2007 | Rosauer | G06N 5/022 706/21 |
| 2009/0177612 A1 | 7/2009 | Gorham | |
| 2009/0210363 A1* | 8/2009 | Grabarnik | G06K 9/6247 706/12 |
| 2010/0169158 A1* | 7/2010 | Agarwal | G06K 9/6226 705/7.11 |
| 2011/0046924 A1* | 2/2011 | Natarajan | G06F 17/18 703/2 |
| 2011/0123100 A1* | 5/2011 | Carroll | G06N 5/003 382/155 |
| 2011/0235798 A1* | 9/2011 | Ibrahim | H04M 3/5238 379/265.14 |
| 2012/0158624 A1* | 6/2012 | Lingenfelder | G06F 17/18 706/12 |
| 2014/0258355 A1 | 9/2014 | Chu et al. | |
| 2014/0376645 A1* | 12/2014 | Kumar | H04N 19/89 375/240.27 |
| 2015/0120758 A1* | 4/2015 | Cichosz | G06F 16/25 707/748 |

OTHER PUBLICATIONS

Vincent Calcagno and Claire de Mazancourt, "glmulti: An R Package for Easy Automated Model Selection with (Generalized) Linear Models", May 2010, Journal of Statistical Software, vol. 34 Issue 12, pp. 1-29.*

Martin Kulldorff, Lan Huang and Kevin Konty, "A scan statistic for continuous data based on the normal probability model", Oct. 20, 2009, International Journal of Health Geographics, 8:58, pp. 1-9.*

Bart Van Der Paal, "A Comparison of Different Methods for Modelling Rare Events Data", Aug. 2014, https://lib.ugent.be/fulltxt/RUG01/002/163/708/RUG01-002163708_2014_0001_AC.pdf , p. 1-70. (Year: 2014).*

Nelder, et al., "Generalized Linear Models," Journal of the Royal Statistical Society, Series A (General), vol. 135, No. 3, 1972, accessed on May 22, 2005, pp. 370-384.

McCullagh, et al., "An outline of generalized linear models," Generalized Linear Models, Second Edition, Aug. 1989, pp. 21-47.

Manning, et al., "Estimating log models: to transform or not to transform?," Journal of Health Ecomonics 20, Mar. 2001, pp. 461-494.

Weisberg, et al., "Adapting for the Missing Link," The Annals of Statistics, Feb. 1994, vol. 22, No. 4, pp. 1674-1700.

Pregibon, et al., "Goodness of Link Tests for Generalized Linear Models," Appl. Statist. No. 1, 1980, pp. 15-24 (Applicant points out that, in accordance with MPEP 609.04(a), the 1980 year of publication is sufficiently earlier than the effective U.S. filing date and any foreign priority date of Jun. 30, 2015 so that the particular month of publication is not in issue.)

"Logistic Regression Algorithms," IBM Corporation, Copyright 1989, 2012, accessed on Feb. 20, 2015, pp. 530-539 (Applicant points out that, in accordance with MPEP 609.04(a), the 1988, 2012 years of publication are sufficiently earlier than the effective U.S. filing date and any foreign priority date of Jun. 30, 2015 so that the particular month of publication is not in issue.).

Friedman, et al., "Regularization Paths for Generalized Linear Models via Coordinate Descent," Journal of Statistical Software, vol. 33, Issue 1, Jan. 2010, 22 pp.

James, et al., "A generalized Dantzig selector with shrinkage tuning," Bimetrika, 2009, accessed on Feb. 20, 2015, pp. 323-337 (Applicant points out that, in accordance with MPEP 609.04(a), the 2009 year of publication is sufficiently earlier than the effective U.S. filing date and any foreign priority date of Jun. 30, 2015 so that the particular month of publication is not in issue.)

Li, et al., "Variable Selection via Nonconcave Penalized Likelihood and its Oracle Properties," Journal of American Statistical Association, Dec. 2001, vol. 96, No. 456, pp. 1348-1360.

"Generalized Linear Models," MATLAB & Simulink, retrieved on Feb. 3, 2015, from http://www.mathworks.com/help/stats/generalized-linear-regression.html, 29 pp.

Tutz, et al., "Nonparametric estimation of the link function including variable selection," Stat Comput, Mar. 2012, pp. 545-561.

Calcagno, et al., "glmulti: An R Package for Easy Automated Model Selection with (Generalized) Linear Models," Journal of Statistical Software, vol. 34, Issue 12, May 2012, 29 pp.

Guisan, et al., "Generalized linear and generalized additive models in studies of species distributions: setting the scene." Ecological modelling 157, No. 2, Nov. 2002, pp. 89-100.

Müller, Hans-Georg, et al; "Generalized functional linear models." Annals of Statistics, 2005, accessed on Feb. 3, 2015, pp. 774-805 (Applicant points out that, in accordance with MPEP 609.04(a), the 2005 year of publication is sufficiently earlier than the effective U.S. filing date and any foreign priority date of Jun. 30, 2015 so that the particular month of publication is not in issue.).

* cited by examiner

AUTOMATED SELECTION OF GENERALIZED LINEAR MODEL COMPONENTS FOR BUSINESS INTELLIGENCE ANALYTICS

TECHNICAL FIELD

This disclosure relates to business intelligence systems, and more particularly, to business intelligence analytics systems.

BACKGROUND

Enterprise software systems are typically sophisticated, large-scale systems that support many, e.g., hundreds or thousands, of concurrent users. Examples of enterprise software systems include financial planning systems, budget planning systems, order management systems, inventory management systems, sales force management systems, business intelligence tools, enterprise reporting tools, project and resource management systems, and other enterprise software systems.

Many enterprise performance management and business planning applications require a large base of users to enter data that the software then accumulates into higher level areas of responsibility in the organization. Moreover, once data has been entered, it must be retrieved to be utilized. The system may perform mathematical calculations on the data, combining data submitted by many users. Using the results of these calculations, the system may generate reports for review by higher management. Often these complex systems make use of multidimensional data sources that organize and manipulate the tremendous volume of data using data structures referred to as data cubes. Each data cube, for example, includes a plurality of hierarchical dimensions having levels and members for storing the multidimensional data.

Business intelligence (BI) systems may include analytics systems that may provide insights into collections of enterprise data. An analytics system may be used to explore data, determine cause and effect relationships among data, formulate predictions based on existing data, and support decision-making, for example.

SUMMARY

In one aspect of the invention, a method for selecting components for a generalized linear model includes determining a candidate set of probability distributions, a candidate set of link functions, and a candidate set of predictor variables, based at least in part on a dataset of interest. The method further includes selecting a probability distribution from the initial candidate set of probability distributions and a link function from the initial candidate set of link functions, based at least in part on the candidate set of predictor variables. The method further includes selecting one or more predictor variables from the candidate set of predictor variables, based at least in part on the selected probability distribution and the selected link function. The method further includes determining whether a stopping criterion is fulfilled. The method further includes repeating, in response to determining that a stopping criterion is not fulfilled, the selecting of a probability distribution and a link function based at least in part on a then-currently selected candidate set of predictor variables, and the selecting of one or more predictor variables based at least in part on a then-currently selected probability distribution and link function. The method further includes generating, in response to determining that the stopping criterion is fulfilled, a generalized linear model output comprising the selected probability distribution, the selected link function, and the selected one or more predictor variables.

In another aspect, a computer system for selecting components for a generalized linear model includes one or more processors, one or more computer-readable memories, and one or more computer-readable, tangible storage devices. The computer system further includes program instructions, stored on at least one of the one or more storage devices for execution by at least one of the one or more processors via at least one of the one or more memories, to determine a candidate set of probability distributions, a candidate set of link functions, and a candidate set of predictor variables, based at least in part on a dataset of interest. The computer system further includes program instructions, stored on at least one of the one or more storage devices for execution by at least one of the one or more processors via at least one of the one or more memories, to select a probability distribution from the initial candidate set of probability distributions and a link function from the initial candidate set of link functions, based at least in part on the candidate set of predictor variables. The computer system further includes program instructions, stored on at least one of the one or more storage devices for execution by at least one of the one or more processors via at least one of the one or more memories, to select one or more predictor variables from the candidate set of predictor variables, based at least in part on the selected probability distribution and the selected link function. The computer system further includes program instructions, stored on at least one of the one or more storage devices for execution by at least one of the one or more processors via at least one of the one or more memories, to repeat, in response to determining that a stopping criterion is not fulfilled, the selecting of a probability distribution and a link function based at least in part on a then-currently selected set of predictor variables, and the selecting of one or more predictor variables based at least in part on a then-currently selected probability distribution and link function. The computer system further includes program instructions, stored on at least one of the one or more storage devices for execution by at least one of the one or more processors via at least one of the one or more memories, to generate, in response to determining that the stopping criterion is fulfilled, a generalized linear model output comprising the selected probability distribution, the selected link function, and the selected one or more predictor variables.

In another aspect, a computer program product for selecting components for a generalized linear model includes a computer-readable storage medium having program instructions embodied therewith. The program instructions are executable by a computing device to determine a candidate set of probability distributions, a candidate set of link functions, and a candidate set of predictor variables, based at least in part on a dataset of interest. The program instructions are further executable by a computing device to select a probability distribution from the initial candidate set of probability distributions and a link function from the initial candidate set of link functions, based at least in part on the candidate set of predictor variables. The program instructions are further executable by a computing device to select one or more predictor variables from the candidate set of predictor variables, based at least in part on the selected probability distribution and the selected link function. The program instructions are further executable by a computing device to repeat, in response to determining that a stopping criterion is not fulfilled, the selecting of a probability distribution and a link function based at least in part on a then-currently selected set of predictor variables, and the selecting of one or more predictor variables based at least in part on a then-currently selected probability distribution and link function. The program instructions are further executable by a computing device to generate, in response to determining that the stopping criterion is fulfilled, a generalized linear model output comprising the selected probability distribution, the selected link function, and the selected one or more predictor variables.

The details of one or more embodiments of the disclosure are set forth in the accompanying drawings and the description below. Other features, objects, and advantages of the disclosure will be apparent from the description and drawings, and from the claims.

DETAILED DESCRIPTION

This disclosure is directed generally to techniques that automate the selection of components for a generalized linear model for a given dataset. A system for selecting components for a generalized linear model may automate the component selection and building of a generalized linear model well-suited for a given dataset, and thus allow general business users to access useful generalized linear models for analyzing and exploring a dataset of interest, rather than requiring users with specialized education in statistical analysis to identify the right components to apply in a generalized linear model for a given dataset. General business users may benefit from insights and conclusions enabled by applying the right generalized linear model to their datasets of interest.

Figure 1:
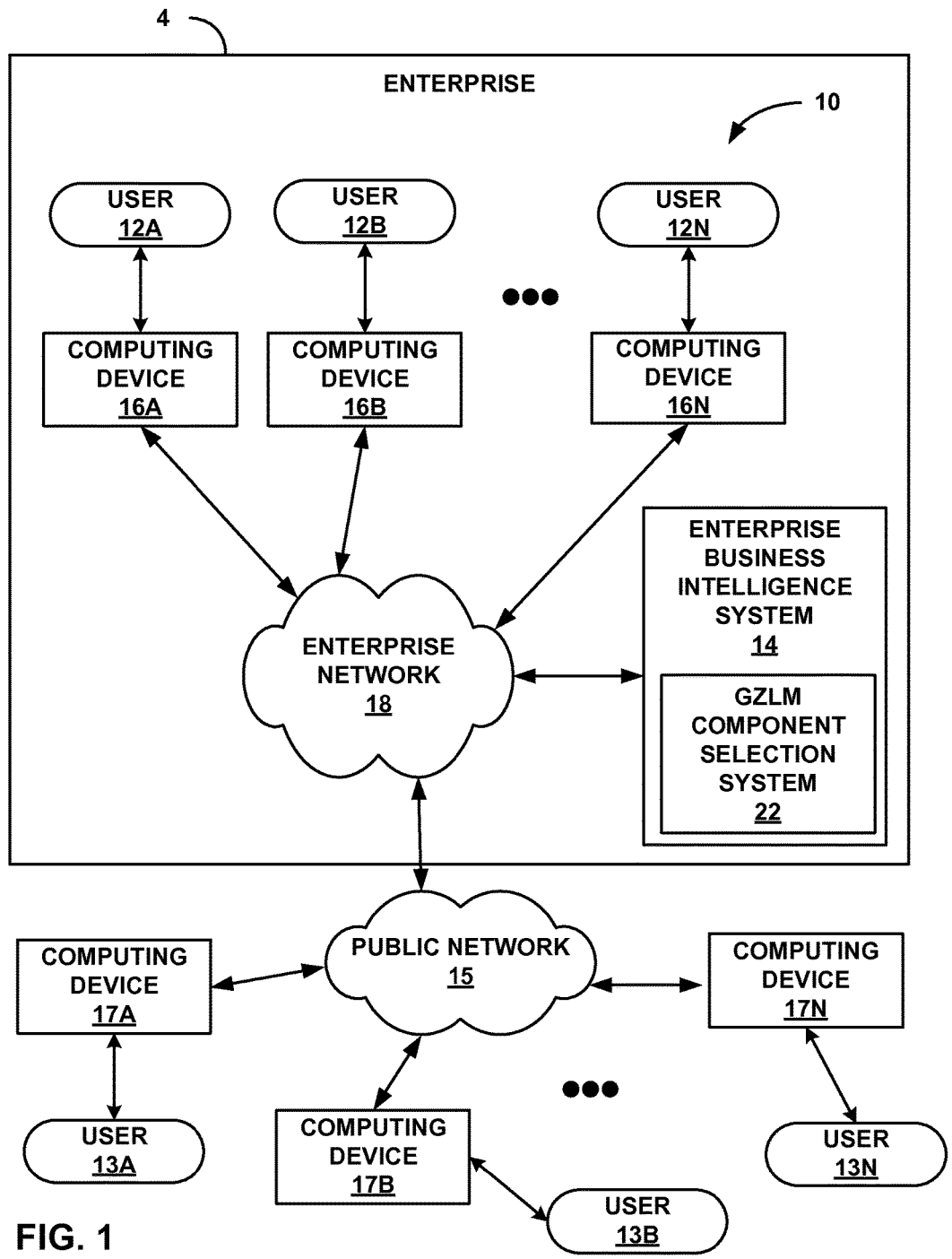
FIG. 1 is a block diagram illustrating an example enterprise software system having a computing environment in which users may interact with an enterprise business intelligence system to use a computer system for selecting components for a generalized linear model.

FIG. 1 illustrates an example context in which a generalized linear model component selection system of this disclosure may be implemented and used. FIG. 1 is a block diagram illustrating an example enterprise 4 having a computing environment 10 in which a plurality of users 12A-12N within enterprise 4 (collectively, "enterprise users 12" or "users 12") may interact with an enterprise business intelligence (BI) system 14 that includes a generalized linear model component selection system 22 ("GZLM component selection system 22"), as described further below. In the system shown in FIG. 1, enterprise business intelligence system 14 is communicatively coupled to a number of client computing devices 16A-16N (collectively, "client computing devices 16" or "computing devices 16") by an enterprise network 18. Users 12 interact with their respective computing devices to access enterprise business intelligence system 14. Users 12, computing devices 16, enterprise network 18, and enterprise business intelligence system 14 may all be either in a single facility or widely dispersed in two or more separate locations anywhere in the world, in different examples.

For exemplary purposes, various examples of the techniques of this disclosure may be readily applied to various software systems, including enterprise business intelligence systems or other large-scale enterprise software systems. Examples of enterprise software systems include enterprise financial or budget planning systems, order management systems, inventory management systems, sales force management systems, business intelligence tools, enterprise reporting tools, project and resource management systems, and other enterprise software systems.

In this example, enterprise BI system 14 includes servers that run BI dashboard web applications and may provide business analytics software. A user 12 may use a BI portal on a client computing device 16 to view and manipulate information such as business intelligence reports ("BI reports") and other collections and visualizations of data via their respective computing devices 16. This may include data from any of a wide variety of sources, including from multidimensional data structures and relational databases within enterprise 4, as well as data from a variety of external sources that may be accessible over public network 15, including external client computing devices 17A-17N (collectively, "external client computing devices 17" or "computing devices 17") used by external users 13A-13N ("external users 13"). Enterprise 4 may thus make GZLM component selection system 22 available to any of users 12 or external users 13.

Users 12, 13 may use a variety of different types of computing devices 16, 17 to interact with enterprise business intelligence system 14 and access data visualization tools and other resources via enterprise network 18. For example, an enterprise user 12 may interact with enterprise business intelligence system 14 and run a business intelligence (BI) portal (e.g., a business intelligence dashboard, etc.) using a laptop computer, a desktop computer, or the like, which may run a web browser. Alternatively, an enterprise user may use a smartphone, tablet computer, or similar device, running a business intelligence dashboard in a web browser, a dedicated mobile application, or other means for interacting with enterprise business intelligence system 14. An external user 13 may also access GZLM component selection system 22 via a smartphone, tablet computer, or similar device, running a business intelligence dashboard in a web browser, a dedicated mobile application, or other means for interacting with certain externally surfaced functions of enterprise business intelligence system 14.

Enterprise network 18 and public network 15 may represent any communication network, and may include a packet-based digital network such as a private enterprise intranet or a public network like the Internet. In this manner, computing environment 10 can readily scale to suit large enterprises. Enterprise users 12 may directly access enterprise business intelligence system 14 via a local area network, or may remotely access enterprise business intelligence system 14 via a virtual private network, remote dial-up, or similar remote access communication mechanism.

Figure 2:
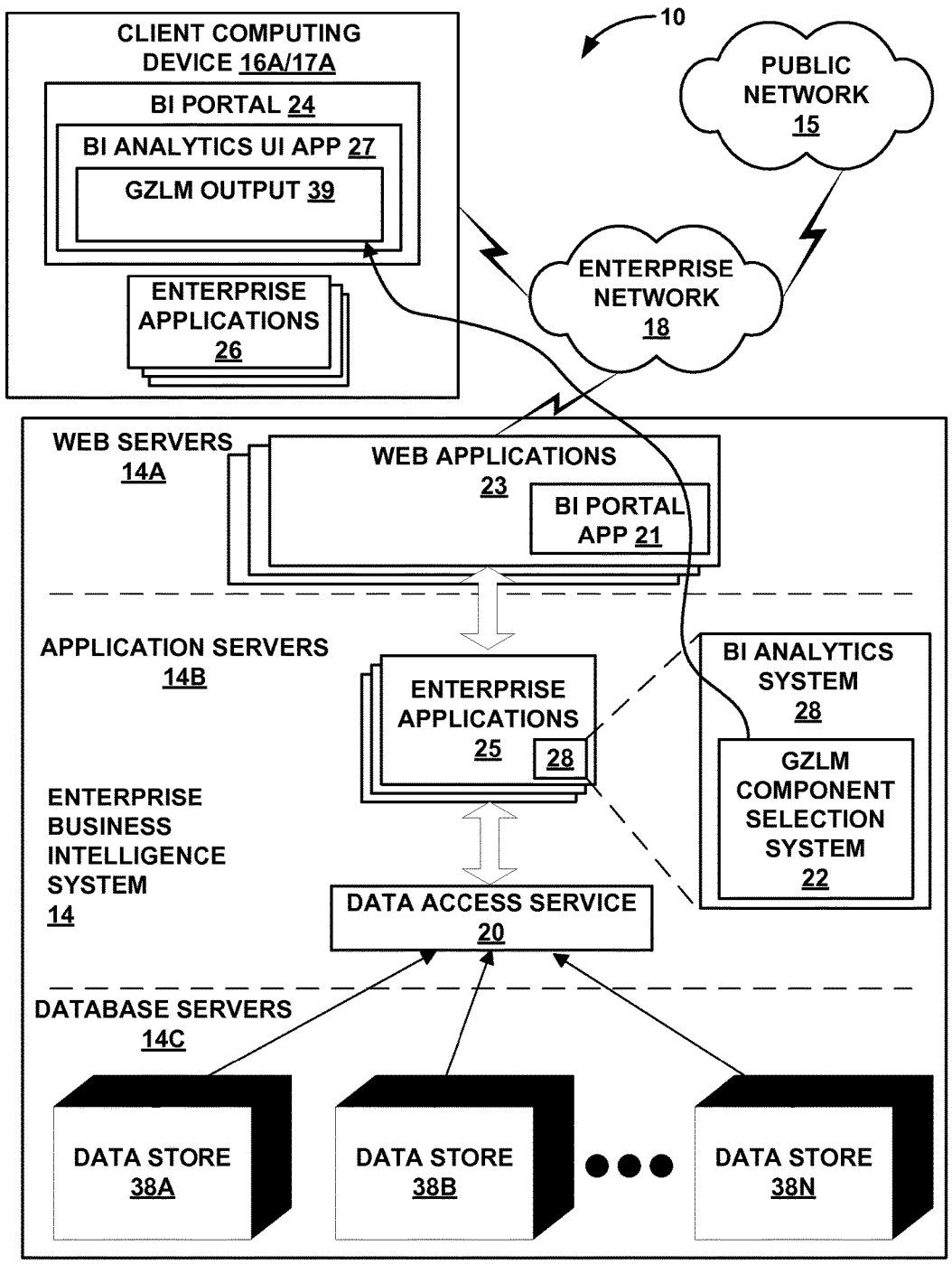
FIG. 2 is a conceptual block diagram illustrating in further detail portions of an example enterprise business intelligence (BI) computing environment that includes a BI analytics system including a generalized linear model component selection system as part of an enterprise BI computing system in one aspect of this disclosure.

FIG. 2 is a conceptual block diagram illustrating in further detail portions of one embodiment of enterprise business intelligence (BI) computing environment 10 that includes a BI analytics system 28 including GZLM component selection system 22 as part of an enterprise BI computing system 14. In this example implementation, a single client computing device 16A is shown for purposes of example and includes a BI portal 24 and one or more client-side enterprise software applications 26 that may utilize and manipulate data, including to view analytics tools and data visualizations with BI portal 24. BI portal 24 may be rendered within a general web browser application, within a locally hosted application or mobile application, or other user interface. BI portal 24 may be generated or rendered using any combination of application software and data local to the computing device it's being generated on, and/or remotely hosted in one or more application servers or other remote resources.

BI portal 24 may include a user interface for a BI analytics user interface (UI) application 27 that may interact with a BI analytics system 28 that comprises GZLM component selection system 22. BI analytics UI application 27 may enable a user of one of client computing devices 16, 17 to enter, select, or indicate a target dataset of interest from any source, in response to which GZLM component selection system 22 may perform an automated selection of generalized linear model components and generate generalized linear model outputs 39 for a generalized linear model well-suited for exploring or analyzing the dataset of interest, as further described below.

BI portal 24 may also output data visualizations for a user to view and manipulate in accordance with various techniques described in further detail below. BI portal 24 may present data in the form of charts or graphs that a user may manipulate, for example. BI portal 24 may present visualizations of data based on data from sources such as a BI report, e.g., that may be generated with enterprise business intelligence system 14, or another BI dashboard, as well as other types of data sourced from external resources through public network 15. BI portal 24 may present visualizations of data based on data that may be sourced from within or external to the enterprise.

FIG. 2 depicts additional detail for enterprise business intelligence system 14 and how it may be accessed via interaction with a BI portal 24 for depicting and providing visualizations of business data. BI portal 24 may provide visualizations of data that represents, provides data from, or links to any of a variety of types of resource, such as a BI report, a software application, a database, a spreadsheet, a data structure, a flat file, Extensible Markup Language ("XML") data, a comma separated values (CSV) file, a data stream, unorganized text or data, or other type of file or resource. BI portal 24 may also provide visualizations of data based on a generalized linear model with automatically selected generalized linear model components generated by GZLM component selection system 22 for exploring or analyzing the dataset of interest, for example.

GZLM component selection system 22 may be hosted among enterprise applications 25, as in the example depicted in FIG. 2, or may be hosted elsewhere, including on a client computing device 16A/17A (which may be a client computing device 16A internal to enterprise computing environment 10 or a client computing device 17A external to enterprise computing environment 10 in different examples), or distributed among various computing resources in enterprise business intelligence system 14, in some examples. GZLM component selection system 22 may be implemented as or take the form of a stand-alone application, a portion or add-on of a larger application, a library of application code, a collection of multiple applications and/or portions of applications, or other forms, and may be executed by any one or more servers, client computing devices, processors or processing units, or other types of computing devices.

As depicted in FIG. 2, enterprise business intelligence system 14 is implemented in accordance with a three-tier architecture: (1) one or more web servers 14A that provide web applications 23 with user interface functions, including a server-side BI portal application 21; (2) one or more application servers 14B that provide an operating environment for enterprise software applications 25 and a data access service 20; and (3) database servers 14C that provide one or more data sources 38A, 38B, . . . , 38N ("data sources 38"). Enterprise software applications 25 may include GZLM component selection system 22 as one of enterprise software applications 25 or as a portion or portions of one or more of enterprise software applications 25.

The data sources 38 may include two-dimensional databases and/or multidimensional databases or data cubes. The data sources may be implemented using a variety of vendor platforms, and may be distributed throughout the enterprise. As one example, the data sources 38 may be multidimensional databases configured for Online Analytical Processing (OLAP). As another example, the data sources 38 may be multidimensional databases configured to receive and execute Multidimensional Expression (MDX) queries of some arbitrary level of complexity. As yet another example, the data sources 38 may be two-dimensional relational databases configured to receive and execute SQL queries, also with an arbitrary level of complexity. Data sources 38 may also include one or more sets of cross sectional data, for example.

Multidimensional data structures are "multidimensional" in that each multidimensional data element is defined by a plurality of different object types, where each object is associated with a different dimension. The enterprise applications 26 on client computing device 16A may issue business queries to enterprise business intelligence system 14 to build reports. Enterprise business intelligence system 14 includes a data access service 20 that provides a logical interface to the data sources 38. Client computing device 16A may transmit query requests through enterprise network 18 to data access service 20. Data access service 20 may, for example, execute on the application servers intermediate to the enterprise software applications 25 and the underlying data sources in database servers 14C. Data access service 20 retrieves a query result set from the underlying data sources, in accordance with query specifications. Data access service 20 may intercept or receive queries, e.g., by way of an API presented to enterprise applications 26. Data access service 20 may then return this result set to enterprise applications 26 as BI reports, other BI objects, and/or other sources of data that are made accessible to BI portal 24 on client computing device 16A. These may include generalized linear models with components generated by GZLM component selection system 22.

As described above and further below, GZLM component selection system 22 may be implemented in one or more computing devices, and may involve one or more applications or other software modules that may be executed on one or more processors. Example embodiments of the present disclosure may illustratively be described in terms of the example of GZLM component selection system 22 in various examples described below.

Figure 3:
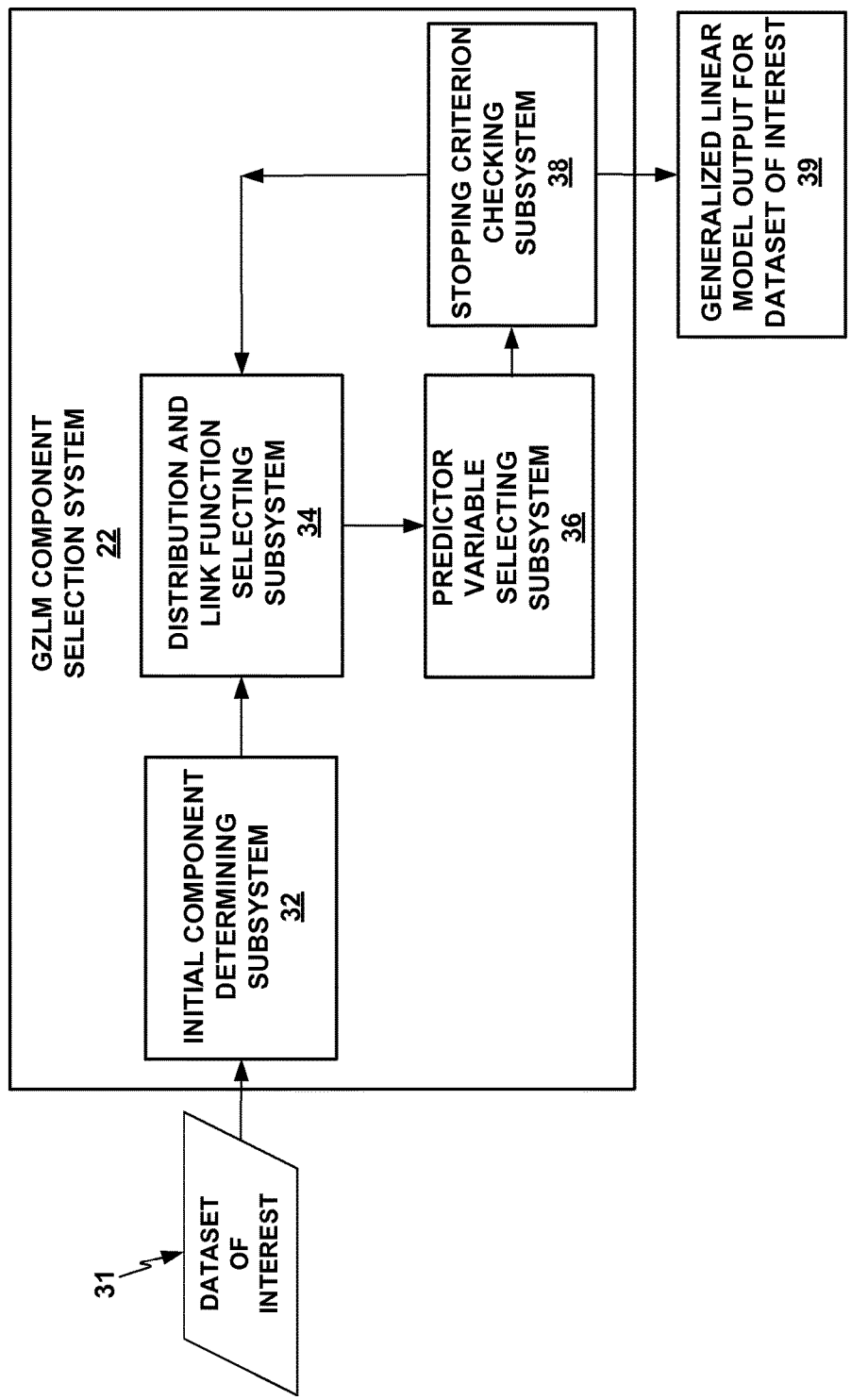
FIG. 3 depicts a conceptual block diagram of a top-level architecture of an example GZLM (GeneraliZed Linear Model) component selection system in one aspect of this disclosure.

FIG. 3 depicts a conceptual block diagram of a top-level architecture of an example GZLM (GeneraliZed Linear Model) component selection system 22 in one aspect of this disclosure. A GZLM component selection system 22 may include an initial candidate component determining subsystem 32, a distribution and link function selecting subsystem 34, a predictor variable selecting subsystem 36, and a stopping criterion checking subsystem 38 (collectively, "subsystems 32-38"). Subsystems 32-38 may each be portions of a single software application, separate software applications, groups of applications, a combination of the above, or other types of portions of software as part of GZLM component selection system 22, in various examples. Initial candidate component determining subsystem 32 may perform any aspect of determining initial candidate components for a generalized linear model as described herein. Distribution and link function selecting subsystem 34 may perform any aspect of selecting a probability distribution from among the candidate probability distributions and selecting a link function from among the candidate link functions as described herein. Predictor variable selecting subsystem 36 may perform any aspect of selecting one or more predictor variables as described herein. Stopping criterion checking subsystem 38 may perform any aspect of checking whether a stopping criterion is fulfilled as described herein.

Stopping criterion checking subsystem 38 may, in response to determining that a stopping criterion is not fulfilled, cause distribution and link function selecting subsystem 34 and predictor variable selecting subsystem 36 to repeat the selecting of a probability distribution and a link function based at least in part on a then-currently selected set of predictor variables, and the selecting of one or more predictor variables based at least in part on a then-currently selected probability distribution and link function. The then-currently selected set of predictor variables during the repeating of the selecting of a probability distribution and a link function may be the initial candidate set of predictor variables or the set of predictor variables selected in the previous iteration of the selecting process, which may or may not be the same as the initial candidate set of predictor variables or a previous selected candidate set of predictor variables. Similarly, the then-currently selected probability distribution and link function during the repeating of the selecting of a probability distribution and a link function may be the probability distribution and link function selected in the previous iteration of the selecting process, and may or may not be the same as a previous selected probability distribution and link function. Stopping criterion checking subsystem 38 may, in response to determining that a stopping criterion is fulfilled, generate a generalized linear model output comprising the selected probability distribution, the selected link function, and the selected one or more predictor variables.

Generalized linear models synthesize a broad class of commonly used regression models for the analysis of both continuous and discrete data in a unified statistical framework. For a dataset with n records, $(y_i, x_i)$, $i=1, \ldots, n$, where $y_i$ denotes a target variable and $x_i$ is a vector of predictor variables. A generalized linear model has three components: a probability distribution, F; a link function, $g(\cdot)$; and a linear predictor, $\eta_i$, and has the form:

$$\eta_i = g(\mu_i) = x_i^T \beta, \quad y_i \sim F.$$

For the probability distribution, F, the target variables $y_i, \ldots, y_n$ are independent and have an identity probability distribution from an exponential family of distributions which may include normal, binomial, gamma, Poisson, and other probability distributions. The link function, $g(\cdot)$, may be monotonic differentiable. The link function states how the expected value of $y_i$, $\mu_i$, is related to the linear predictor $\eta_i$: $g(\mu_i) = \eta_i$. The link function may be identity, logarithm (log), logarithm of the odds (log it), probability unit (probit), inverse, of other link function. The linear predictor, $\eta_i$, may be expressed as linear combinations of unknown parameters $\beta$ with a number of predictor variables, $$\eta_i = x_i^T \beta x.$$

In an example application of applying GZLM component selection system 22 to solve a business problem, a car insurance company may want to know which factors contribute the most to its policyholder's damage claim amounts. The company may have data about policyholders' characteristics, such as age, education level, etc., as well as their cars' characteristics, such as vehicle age, manufacturer, etc. A general business user without specialized statistics education might attempt to fit a linear regression model, which is a generalized linear model in which the distribution component is a normal distribution and the link function component is an identity link function, to a dataset of interest of policyholder characteristics and car characteristics. However, a linear regression model would not be suitable for such a dataset and would not yield useful results, because the claim amount as the target given the predictors doesn't have a normal distribution. Instead, the business user may input the dataset of interest to GZLM component selection system 22, which may perform an automated selection of GZLM components well-suited to this dataset. GZLM component selection system 22 may select a generalized linear model for this dataset with components including a gamma distribution, an inverse link function, and a set of well-suited predictor variables (e.g., policyholder age, vehicle age, vehicle type). A generalized linear model with these particular components is a gamma regression model, and may be the most suitable generalized linear model for exploring and analyzing this particular dataset of interest. The generalized linear model output generated by GZLM component selection system 22 for this dataset may thus yield useful results for exploring and analyzing the data.

As shown in the example above, selecting different combinations of generalized linear model components, including a probability distribution and a link function, can result in different generalized linear models. Some combinations of probability distribution and link function may define well-known models, such as a logistic regression model (defined by a binomial distribution and a log it link function), a log linear model (defined by a Poisson distribution and a log link function), etc., and some combinations may be less well known, such as a gamma regression model in the example discussed above. Generalized linear models may include a wide variety of useful statistical models suitable for exploring and analyzing many types of datasets and may be applied to solve many business problems.

When a user would like to apply a generalized linear model to a set of data, the user may face three challenges corresponding to the three components: how to choose a proper probability distribution from an exponential family of probability distributions; how to select a suitable link function from all link functions applicable to a given probability distribution; and how to select predictor variables when the number of variables in the dataset is large. GZLM component selection system 22 may perform automated selection of all three components of a generalized linear model—distribution, link function, and predictor variables—to be well-suited for a particular dataset. General business users without specialized education in statistics may use an automated system of this disclosure to apply appropriate generalized linear models to their data, instead of requiring statistics experts to determine and apply the appropriate distribution, link function, and predictor variables for the data.

Example GZLM component selection system 22 may apply an iterative, empirical model component selection process to automatically select a probability distribution ("distribution"), a link function, and a set of predictor variables for a generalized linear model. GZLM component selection system 22 may first determine initial candidate sets of the three components (distribution, link function and predictor variables). GZLM component selection system 22 may then iteratively alternate between selecting a combination of a distribution and a link function from among the candidate sets of distributions and link functions, based at least in part on one or more performance measures with respect to the dataset of interest; and then selecting predictor variables from among the candidate sets of predictor variables, based at least in part on the selected distribution and link function. GZLM component selection system 22 may continue iterating through selecting combinations of a distribution and a link function and selecting predictor variables until GZLM component selection system 22 determines that a stopping criterion is met.

GZLM component selection system 22 may determine the initial candidate sets for the distribution and link function in combination, based on metadata of the dataset of interest, such as the measurement level, storage type, and/or range of the target variable for the dataset of interest. GZLM component selection system 22 may determine the initial candidate set of predictor variables based at least in part on a specification that may be indicated or input by a user. To select a distribution and a link function from among the candidate sets, GZLM component selection system 22 may build a generalized linear model for each of a set of candidate combinations of distribution and link function, based at least in part on metadata of the dataset and/or based at least in part on a presently selected set of predictor variables, and then select a combination of distribution and link function that performs best based on a performance measure. To select the predictor variables, GZLM component selection system 22 may apply a variable selection process to the candidate set of predictor variables, based at least in part on the previously selected combination of distribution and link function. GZLM component selection system 22 may check whether the currently selected components fulfill the stopping criterion, and may iteratively repeat the selecting of combinations of a distribution and a link function and the selecting of predictor variables until the stopping criterion is met. Once the stopping criterion is met, GZLM component selection system 22 may generate a generalized linear model output with the selected distribution, link function, and predictor variables.

Figure 4:
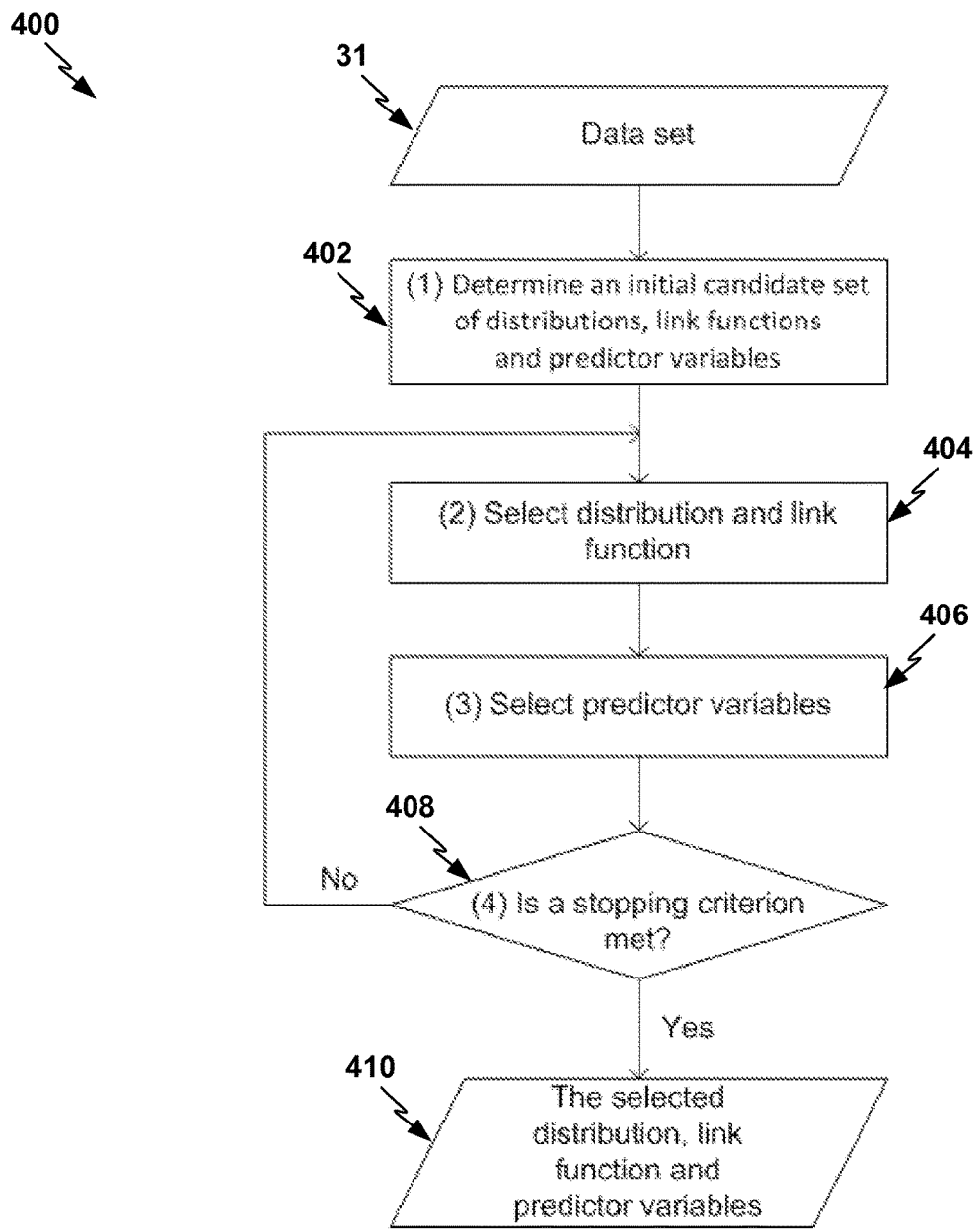
FIG. 4 depicts a flowchart of an example iterative process of selecting components for a generalized linear model that GZLM component selection system may perform in one aspect of this disclosure.

FIG. 4 depicts a flowchart of an example iterative process 400 of selecting components for a generalized linear model that GZLM component selection system 22 may perform. GZLM component selection system 22 may first determine an initial candidate set of distributions, link functions, and predictor variables (402) based at least in part on a dataset of interest 31. GZLM component selection system 22 may then select a distribution and a link function (404). GZLM component selection system 22 may then select predictor variables (406). GZLM component selection system 22 may then check a stopping criterion (408). If the stopping criterion is not yet met, GZLM component selection system 22 may again iterate through selecting a distribution and a link function (404) and selecting predictor variables (406). If the stopping criterion is met, GZLM component selection system 22 may stop and output the selected distribution, link function and predictor variables (410).

Additional details for iterative process 400 and various functions involved therein are provided below. For GZLM component selection system 22 first determining the initial candidate set of distributions, link functions, and predictor variables (402), regarding the distributions, GZLM component selection system 22 may generally seek to select distributions from within the framework of the exponential family of distributions, with which to formulate a generalized linear model. The exponential family of distributions includes many commonly used distributions, such as normal, Bernoulli, binomial, Poisson, and ordinal multinomial distributions, as well as some less widely used distributions, such as gamma, inverse Gaussian, and negative binomial distributions. GZLM component selection system 22 may select a distribution from among two or more of a normal distribution, a Bernoulli distribution, a binomial distribution, a Poisson distribution, an ordinal multinomial distribution, a gamma distribution, an inverse Gaussian distribution, and a negative binomial distribution.

GZLM component selection system 22 may select a candidate set of distributions based on metadata of a target variable from the dataset of interest. The metadata of the target variable in the dataset of interest may include the measurement level, the storage type, the range, or any one or more of various properties or characteristics of the target variable. In various examples, metadata of the target variable may indicate a measurement level of either continuous or ordinal. In various examples, metadata of the target variable may indicate a storage type or data type or variable type as real numbers, or integers, or string/numeric. In various examples, metadata of the target variable may indicate a range of the target as either positive, or non-negative (greater than or equal to zero), or of two levels, or of more than two levels. Table 1 below gives a list of eight example candidate distributions, among many other potential candidate distributions, with example metadata for measurement level, storage type, and range of the target dataset with corresponding example candidate distributions that may be well-suited to the dataset as indicated by the metadata.

TABLE 1

List of candidate distributions based on metadata of the target variable

| Measurement level | Storage type | Range | Candidate distributions |
| --- | --- | --- | --- |
| Continuous | Real | Positive (>0) | Normal, Inverse Gaussian, Gamma |
| | Real | Non-negative (≥0) | Normal |
| | Integer | Positive (>0) | Normal, Inverse Gaussian, Gamma, Poisson, Negative binomial, Binomial |
| | Integer | Non-negative (≥0) | Normal, Poisson, Negative binomial, Binomial |

TABLE 1-continued

List of candidate distributions based on metadata of the target variable

| Measurement level | Storage type | Range | Candidate distributions |
|---|---|---|---|
| Ordinal | String/numeric | 2 levels | Bernoulli |
| | String/numeric | >2 levels | Ordinal multinomial |

Thus, in various examples, GZLM component selection system 22 selecting the probability distribution may include selecting from among a normal distribution, an inverse Gaussian distribution, and a Gamma distribution in response to determining that the target variable has continuous measurement level, real storage type, and positive range; selecting a normal distribution in response to determining that the target variable has continuous measurement level, real storage type, and non-negative range; selecting from among a normal distribution, an inverse Gaussian distribution, a Gamma distribution, a Poisson distribution, a negative binomial distribution, and a binomial distribution in response to determining that the target variable has continuous measurement level, integer storage type, and positive range; selecting from among a normal distribution, a Poisson distribution, a negative binomial distribution, and a binomial distribution in response to determining that the target variable has continuous measurement level, integer storage type, and non-negative range; selecting a Bernoulli distribution in response to determining that the target variable has ordinal measurement level, string/numeric storage type, and two levels of range; and selecting an ordinal multinomial distribution in response to determining that the target variable has ordinal measurement level, string/numeric storage type, and more than two levels of range.

Some link functions may be suitable for some distributions, and some link functions may not be suitable for some distributions. For example, the link functions of identity, log, and power (α) (where α is a real number), may be suitable for all distributions except ordinal multinomial, while the link functions of log it, probit, complementary log-log, log-complement, negative log-log, and odds power (α) (where α is a real number) may be suitable for only certain distributions such as binomial or Bernoulli distributions. For an ordinal multinomial distribution, since the cumulative probabilities are used in the target variable, the link functions for binomial or Bernoulli distribution would add "cumulative" to them when applied to an ordinal multinomial distribution, for example, link functions of cumulative log it, cumulative probit, or cumulative complementary log-log.

In various examples, GZLM component selection system 22 may select the link function from among two or more of: an identity link function, a logarithm (log) link function, a logarithm of the odds (log it) link function, a probability unit (probit) link function, a complementary log-log link function, a negative binomial link function, a cumulative log it link function, a cumulative probit link function, a cumulative complementary log-log link function, and one or more link functions in the form of a power (α) link function (where α is a real number), such as a power (0.5) link function, a power (−1) link function, and a power (−2) link function. In some examples, it may pose a large processing burden to check every possible combination of distribution and link function with regard to suitability for the dataset. In some examples, GZLM component selection system 22 may process more quickly by evaluating a limited number of default candidate link functions (e.g., three default candidate link functions) as candidates for each corresponding distribution, based on the type of distribution. In some examples, GZLM component selection system 22 may store one or more default candidate link functions corresponding to each type of distribution. Example sets of three default candidate link functions to test for each of a number of given distributions are shown below in Table 2. Some combinations of distribution and link function form relatively widely used generalized linear models. For example, a normal distribution with an identity link function forms a linear regression model; a binomial distribution with a log it link function forms a logistic regression model; and a Poisson distribution with a log link function forms a log-linear model.

TABLE 2

List of candidate link functions based on distribution of the target variable

| Distribution | Example default candidate link functions |
|---|---|
| Normal | Identity, log, power(0.5) |
| Inverse Gaussian | Identity, log, power(−2) |
| Gamma | Identity, log, power(−1) |
| Negative binomial | Identity, log, negative binomial |
| Poisson | Identity, log, power(0.5) |
| Binomial | Logit, probit, complementary log-log |
| Bernoulli | Logit, probit, complementary log-log |
| Ordinal multinomial | Cumulative logit, cumulative probit, cumulative complimentary log-log |

Thus, in some examples as shown in Table 2, GZLM component selection system 22 may select from among an identity link function, a log link function, or a power (0.5) link function in combination with a normal distribution; GZLM component selection system 22 may select from among an identity link function, a log link function, or a power (−2) link function in combination with an inverse Gaussian distribution; GZLM component selection system 22 may select from among an identity link function, a log link function, or a power (−1) link function in combination with a gamma distribution; GZLM component selection system 22 may select from among an identity link function, a log link function, or a negative binomial link function in combination with a negative binomial distribution; GZLM component selection system 22 may select from among an identity link function, a log link function, or a power (0.5) link function in combination with a Poisson distribution; GZLM component selection system 22 may select from among a log it link function, a probit link function, or a complementary log-log link function in combination with a binomial distribution; GZLM component selection system 22 may select from among a log it link function, a probit link function, or a complementary log-log link function in combination with a Bernoulli distribution; and GZLM component selection system 22 may select from among a cumulative log it link function, a cumulative probit link function, or a cumulative complementary log-log link function in combination with an ordinal multinomial distribution. In other examples, GZLM component selection system 22 may select from among only two of the link functions among those listed in Table 2 or may select one particular link function among those listed in Table 2. In other examples, GZLM component selection system 22 may select from among other link functions in combination with each distribution.

In some examples in which time is not a primary constraint, GZLM component selection system 22 may also be configured to test larger numbers of candidate link functions to broaden the search space. More generally, GZLM component selection system 22 may store a ranked list of default candidate link functions corresponding to each distribution, and expand or restrict the number of default candidate link functions accessed and used, in order of their ranking in the ranked list, based on configuration settings for speed versus breadth (e.g., where greater breadth may enable higher accuracy). For example, the link functions may be ranked in the order in which they appear in Table 2 above, such that, e.g., for a normal distribution, the first ranked candidate link function may be the identity link function, the second ranked link function may be the log link function, and the third ranked link function may be the power (0.5) link function, and so forth. Thus, GZLM component selection system 22 may test and select from among relatively fewer, higher-ranked default candidate link functions when the configuration setting is set to prioritize speed over breadth, and GZLM component selection system 22 may test and select from among relatively more default candidate link functions when the configuration setting is set to prioritize breadth over speed.

GZLM component selection system 22 may combine information on candidate distributions based on metadata of the target variable (as in Table 1) and candidate link functions based on distribution of the target variable (as in Table 2) to select a candidate combination of a distribution and a link function. In some examples, GZLM component selection system 22 may first determine an initial distribution and link function in combination by determining a candidate distribution based on metadata of the target and determining an initial candidate link function that corresponds with the initial candidate distribution. In some examples, GZLM component selection system 22 may also perform distribution selection and link function selection as parallel processes, and test different combinations of distributions and link functions with one or more given sets of predictor variables as different candidate generalized linear models in parallel.

GZLM component selection system 22 may determine an initial set of candidate predictor variables based on a specification, e.g., as input by a user. GZLM component selection system 22 may be configured to enable a user to select all or some predictor variables available in a dataset, and optionally to add some possible interaction effects of the candidate predictor variables with the selected combination of distribution and link function.

After GZLM component selection system 22 has made the initial determination of the initial candidate components, GZLM component selection system 22 may then select a combination of distribution and link function from among the candidate combinations of distribution and link function, given the initially determined set of predictor variables, and based on a performance measure. In selecting a performance measure, GZLM component selection system 22 may divide the data from the dataset of interest into a training dataset and a testing dataset. In one example, GZLM component selection system 22 may assign 70% of the data from the target dataset to a training dataset and the other 30% of the data from the target dataset to a testing dataset. In other examples, GZLM component selection system 22 may assign more or less data to each of the training and testing datasets. GZLM component selection system 22 may then determine the performance measure based on the testing dataset. By apportioning the data between training and testing, GZLM component selection system 22 may help avoid an over-fitting problem, for example. GZLM component selection system 22 may use the training dataset to fit or compare each of a number of models for different combinations of distributions and link functions with the given set of predictor variables. For example, GZLM component selection system 22 may use and determine an average square error (ASE) over the testing dataset as a performance measure. Table 3 below gives definitions and formulae of ASE as GZLM component selection system 22 may apply as a performance measure for comparing combinations of distributions and link functions with the given set of predictor variables.

TABLE 3

Average square error (ASE)

| Basic statistics | $y_i$ denotes the observed value of the $i^{th}$ target record<br>$\hat{y}_i$ denotes the predicted value of the $i^{th}$ target record (for all distributions except ordinal multinomial)<br>$\hat{\pi}_{ij}$ denotes the predicted probability for category j corresponding to the $i^{th}$ record (for ordinal multinomial)<br>n denotes the number of records in the testing set |
|---|---|
| ASE | For the target variable with all distributions except ordinal multinomial, ASE is calculated as<br><br>$$ASE = \frac{1}{n}\sum_{i=1}^{n}(y_i - \hat{y}_i)^2$$<br><br>For the target variable with ordinal multinomial, ASE is calculated as<br><br>$$ASE = \frac{1}{n}\sum_{i=1}^{n} I\left(y_i \neq \arg\max_j \hat{\pi}_{ij}\right)$$<br><br>where $I(\cdot)$ is an indicator function. |

GZLM component selection system 22 may then select suitable predictor variables from a set of candidate predictor variables, given the previously selected combination of distribution and link function. GZLM component selection system 22 may use any variable selection methods for selecting suitable predictor variables for generalized linear models, such as those described above. To select predictor variables in some examples in which the number of predictor variables is larger than number of records in the dataset, GZLM component selection system 22 may use regularized estimation processes over stepwise processes to select predictor variables.

GZLM component selection system 22 may then check the stopping criterion and determine whether to stop the iterative process of selecting candidate components for a generalized linear model and output a conclusion, or to continue iterating the process of selecting candidate components. In some examples, the stopping criterion may be or may include that the selected distribution, link function, and predictor variables in the current iteration are the same as in the previous iteration, which would indicate that GZLM component selection system 22 has arrived at a stable answer for the most well-suited components for a generalized linear model for the dataset of interest. In some examples, the stopping criterion may also include a maximum number of iterations, to prevent the processing from continuing for more than a desired length of time, in the event that the primary stopping criterion (e.g., returning the same selected distribution, link function, and predictor variables for two iterations in a row) is not reached in that desired length of time.

If GZLM component selection system 22 determines that the stopping criterion is not met, GZLM component selection system 22 may perform another iteration of selecting a combination of distribution and link function based at least in part on performance, with the presently selected predictor variables, with respect to the performance measure, and then selecting predictor variables based at least in part on the presently selected combination of distribution and link function. If GZLM component selection system 22 determines that the stopping criterion is met, GZLM component selection system 22 may output the finally selected distribution, link function, and predictor variables.

GZLM component selection system 22 may also modify the iterative process of selecting candidate components from one iteration to the next, such as between the first iteration and the subsequent iterations. As an example of modifying the candidate component selecting process from one iteration to one or more subsequent iterations, GZLM component selection system 22 may save the top one or more combinations of distributions and link functions (e.g., the top three combinations of distributions and link functions) from one iteration as saved reference combinations. The saved reference combinations may be the top-performing combinations as determined by GZLM component selection system 22 in terms of the performance measure, such as the ASE performance measure.

Thus, for example, in the first iteration of evaluating combinations of distribution and link function, GZLM component selection system 22 may determine three combinations of distribution and link function that have the lowest ASE values to be the three combinations that perform best with reference to the performance measure. GZLM component selection system 22 may then save these three combinations of distributions and link functions having the lowest ASE values from the first iteration as reference combinations. GZLM component selection system 22 may then refer to and test the reference combinations of distributions and link functions in one or more subsequent iterations of evaluating the combinations of distribution and link function. For example, GZLM component selection system 22 may in a subsequent iteration select one of the saved reference combinations to test with reference to a performance test (e.g., ASE) in combination with the newly iteratively selected predictor variables. Saving a number of reference combinations from the first iteration to test in subsequent iterations may, in some examples, reduce processing time and accelerate the component selection process.

In some examples, if the dataset is larger than a given threshold size, GZLM component selection system 22 may also first select a random sample of the full dataset to use rather than performing its processes on the entire dataset. In some examples, GZLM component selection system 22 may present configuration settings to a user to select configuration settings that tradeoff between speed and breadth of sample size testing for large datasets, such that if the user selects a setting for faster speed, GZLM component selection system 22 may opt to select a random sample of the dataset, while if the user selects a setting for higher breadth of testing (which may result in more accurate selection), GZLM component selection system 22 may opt to use the entire dataset. In some examples in which the configuration is set to use a random sample of the dataset, GZLM component selection system 22 may enable the user to configure the relative or absolute size of the dataset to use, to tune the tradeoff between speed and breadth.

In some examples, GZLM component selection system 22 may enable any or all of various factors to be configured independently as different settings for tuning the speed of processing, such factors including one or more of: the size of the random sample of the dataset, the maximum number of iterations for the stopping criterion, the number of link functions from a ranked list of link functions, and whether or how many reference combinations of distribution and link function to save. In other examples, GZLM component selection system 22 may simply offer a single speed versus breadth configuration setting, and GZLM component selection system 22 may adjust the size of dataset, the maximum number of iterations for the stopping criterion, and whether or how many reference combinations of distribution and link function to save, with reference to the single speed versus accuracy configuration setting.

Figure 5:
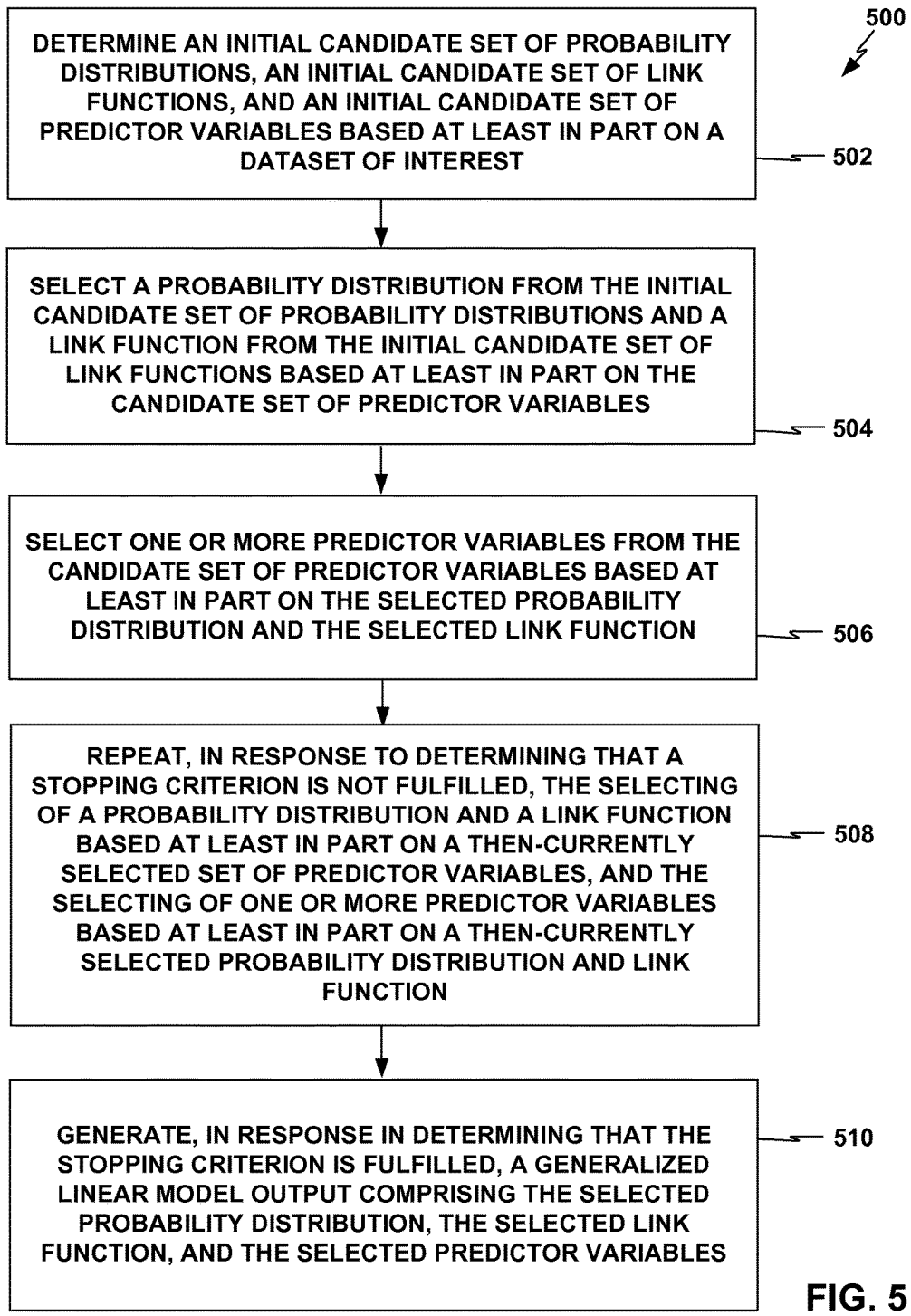
FIG. 5 shows a flowchart for an example overall process 180 that GZLM component selection system, executing on one or more computing devices may perform in one aspect of this disclosure.

FIG. 5 shows a flowchart for an example overall process 500 that GZLM component selection system 22, executing on one or more computing devices (e.g., servers, computers, processors, etc.), may perform. GZLM component selection system 22 may determine a candidate set of probability distributions, a candidate set of link functions, and a candidate set of predictor variables, based at least in part on a dataset of interest (e.g., determining the initial candidate sets of GZLM components as further described above) (502). GZLM component selection system 22 may select a probability distribution from the initial candidate set of probability distributions and a link function from the initial candidate set of link functions, based at least in part on the candidate set of predictor variables (e.g., selecting a probability distribution and a link function as further described above) (504). GZLM component selection system 22 may select one or more predictor variables from the candidate set of predictor variables, based at least in part on the selected probability distribution and the selected link function (e.g., selecting predictor variables as described above) (506). GZLM component selection system 22 may repeat, in response to determining that a stopping criterion is not fulfilled, the selecting of a probability distribution and a link function based at least in part on a then-currently selected set of predictor variables, and the selecting of one or more predictor variables based at least in part on a then-currently selected probability distribution and link function (e.g., determining that the resulting GZLM components are not the same as resulted from the previous iteration of the component selecting process, or a maximum number of iterations or a maximum processing time is not reached, as described above, such that the stopping criterion is not fulfilled, and in response, reiterating the processes of selecting a probability distribution and a link function based at least in part on a then-currently selected set of predictor variables, and the selecting of one or more predictor variables based at least in part on a then-currently selected probability distribution and link function, as described above) (508). GZLM component selection system 22 may then generate, in response to determining that the stopping criterion is fulfilled, a generalized linear model output comprising the selected probability distribution, the selected link function, and the selected one or more predictor variables (e.g., output a GZLM for the dataset of interest as described above) (510).

Figure 6:
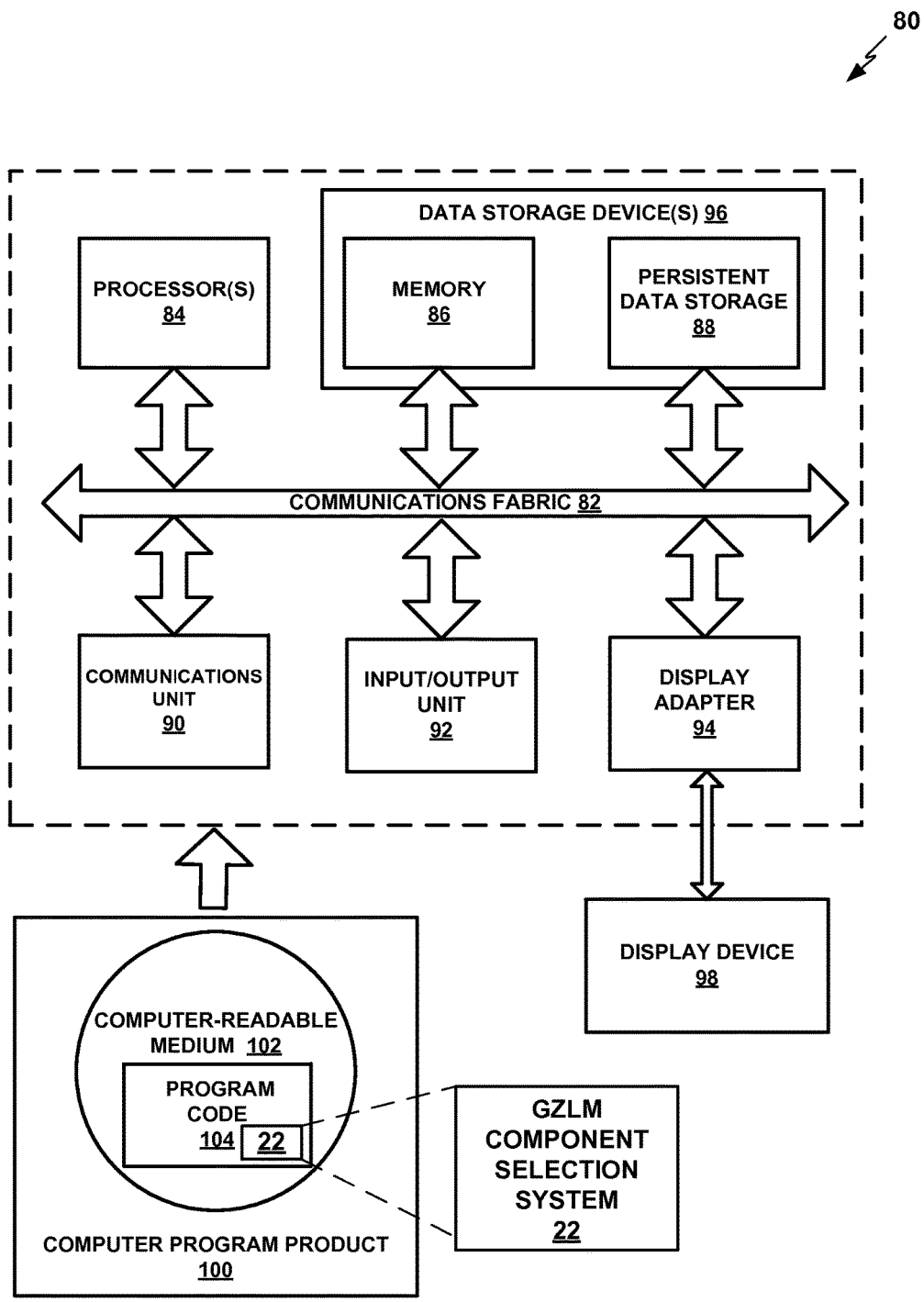
FIG. 6 is a block diagram of a computing device that may be used to implement and execute a GZLM component selection system, according to an illustrative aspect of this disclosure.

FIG. 6 is a block diagram of a computing device 80 that may be used to implement and execute a GZLM component selection system 22, according to an illustrative aspect of this disclosure. Computing device 80 may be a server such as one of web servers 14A or application servers 14B as depicted in FIG. 2. Computing device 80 may also be any server for providing an enterprise business intelligence application in various examples, including a virtual server that may be run from or incorporate any number of computing devices. A computing device may operate as all or part of a real or virtual server, and may be or incorporate a workstation, server, mainframe computer, notebook or laptop computer, desktop computer, tablet, smartphone, feature phone, or other programmable data processing apparatus of any kind Other implementations of a computing device 80 may include a computer having capabilities or formats other than or beyond those described herein.

In the illustrative example of FIG. 6, computing device 80 includes communications fabric 82, which provides communications between processor unit 84, memory 86, persistent data storage 88, communications unit 90, and input/output (I/O) unit 92. Communications fabric 82 may include a dedicated system bus, a general system bus, multiple buses arranged in hierarchical form, any other type of bus, bus network, switch fabric, or other interconnection technology. Communications fabric 82 supports transfer of data, commands, and other information between various subsystems of computing device 80.

Processor unit 84 may be a programmable central processing unit (CPU) configured for executing programmed instructions stored in memory 86. In another illustrative example, processor unit 84 may be implemented using one or more heterogeneous processor systems in which a main processor is present with secondary processors on a single chip. In yet another illustrative example, processor unit 84 may be a symmetric multi-processor system containing multiple processors of the same type. Processor unit 84 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 84 may include a multi-core processor, such as a dual core or quad core processor, for example. Processor unit 84 may include multiple processing chips on one die, and/or multiple dies on one package or substrate, for example. Processor unit 84 may also include one or more levels of integrated cache memory, for example. In various examples, processor unit 84 may comprise one or more CPUs distributed across one or more locations.

Data storage 96 includes memory 86 and persistent data storage 88, which are in communication with processor unit 84 through communications fabric 82. Memory 86 can include a random access semiconductor memory (RAM) for storing application data, i.e., computer program data, for processing. While memory 86 is depicted conceptually as a single monolithic entity, in various examples, memory 86 may be arranged in a hierarchy of caches and in other memory devices, in a single physical location, or distributed across a plurality of physical systems in various forms. While memory 86 is depicted physically separated from processor unit 84 and other elements of computing device 80, memory 86 may refer equivalently to any intermediate or cache memory at any location throughout computing device 80, including cache memory proximate to or integrated with processor unit 84 or individual cores of processor unit 84.

Persistent data storage 88 may include one or more hard disc drives, solid state drives, flash drives, rewritable optical disc drives, magnetic tape drives, or any combination of these or other data storage media. Persistent data storage 88 may store computer-executable instructions or computer-readable program code for an operating system, application files comprising program code, data structures or data files, and any other type of data. These computer-executable instructions may be loaded from persistent data storage 88 into memory 86 to be read and executed by processor unit 84 or other processors. Data storage 96 may also include any other hardware elements capable of storing information, such as, for example and without limitation, data, program code in functional form, and/or other suitable information, either on a temporary basis and/or a permanent basis.

Persistent data storage 88 and memory 86 are examples of physical, tangible, non-transitory computer-readable data storage devices. Data storage 96 may include any of various forms of volatile memory that may require being periodically electrically refreshed to maintain data in memory, while those skilled in the art will recognize that this also constitutes an example of a physical, tangible, non-transitory computer-readable data storage device. Executable instructions may be stored on a non-transitory medium when program code is loaded, stored, relayed, buffered, or cached on a non-transitory physical medium or device, including if only for only a short duration or only in a volatile memory format.

Processor unit 84 can also be suitably programmed to read, load, and execute computer-executable instructions or computer-readable program code for a GZLM component selection system 22, as described in greater detail above. This program code may be stored on memory 86, persistent data storage 88, or elsewhere in computing device 80. This program code may also take the form of program code 104 stored on computer-readable medium 102 comprised in computer program product 100, and may be transferred or communicated, through any of a variety of local or remote means, from computer program product 100 to computing device 80 to be enabled to be executed by processor unit 84, as further explained below.

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft® Corporation, a network operating system such as JavaOS® from Oracle® Corporation, or any other suitable operating system. Processor unit 84 can be suitably programmed to read, load, and execute instructions of the operating system.

Communications unit 90, in this example, provides for communications with other computing or communications systems or devices. Communications unit 90 may provide communications through the use of physical and/or wireless communications links. Communications unit 90 may include a network interface card for interfacing with a LAN 16, an Ethernet adapter, a Token Ring adapter, a modem for connecting to a transmission system such as a telephone line, or any other type of communication interface. Communications unit 90 can be used for operationally connecting many types of peripheral computing devices to computing device 80, such as printers, bus adapters, and other computers. Communications unit 90 may be implemented as an expansion card or be built into a motherboard, for example.

The input/output unit 92 can support devices suited for input and output of data with other devices that may be connected to computing device 80, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 92 may also include any type of interface for video output in any type of video output protocol and any type of monitor or other video display technology, in various examples. It will be understood that some of these examples may overlap with each other, or with example components of communications unit 90 or data storage 96. Input/output unit 92 may also include appropriate device drivers for any type of external device, or such device drivers may reside elsewhere on computing device 80 as appropriate.

Computing device 80 also includes a display adapter 94 in this illustrative example, which provides one or more connections for one or more display devices, such as display device 98, which may include any of a variety of types of display devices. It will be understood that some of these examples may overlap with example components of communications unit 90 or input/output unit 92. Input/output unit 92 may also include appropriate device drivers for any type of external device, or such device drivers may reside elsewhere on computing device 80 as appropriate. Display adapter 94 may include one or more video cards, one or more graphics processing units (GPUs), one or more video-capable connection ports, or any other type of data connector capable of communicating video data, in various examples. Display device 98 may be any kind of video display device, such as a monitor, a television, or a projector, in various examples.

Input/output unit 92 may include a drive, socket, or outlet for receiving computer program product 100, which comprises a computer-readable medium 102 having computer program code 104 stored thereon. For example, computer program product 100 may be a CD-ROM, a DVD-ROM, a Blu-Ray disc, a magnetic disc, a USB stick, a flash drive, or an external hard disc drive, as illustrative examples, or any other suitable data storage technology.

Computer-readable medium 102 may include any type of optical, magnetic, or other physical medium that physically encodes program code 104 as a binary series of different physical states in each unit of memory that, when read by computing device 80, induces a physical signal that is read by processor 84 that corresponds to the physical states of the basic data storage elements of storage medium 102, and that induces corresponding changes in the physical state of processor unit 84. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 84, thereby physically causing or configuring processor unit 84 to generate physical outputs that correspond to the computer-executable instructions, in a way that causes computing device 80 to physically assume new capabilities that it did not have until its physical state was changed by loading the executable instructions comprised in program code 104.

In some illustrative examples, program code 104 may be downloaded over a network to data storage 96 from another device or computer system for use within computing device 80. Program code 104 comprising computer-executable instructions may be communicated or transferred to computing device 80 from computer-readable medium 102 through a hard-line or wireless communications link to communications unit 90 and/or through a connection to input/output unit 92. Computer-readable medium 102 comprising program code 104 may be located at a separate or remote location from computing device 80, and may be located anywhere, including at any remote geographical location anywhere in the world, and may relay program code 104 to computing device 80 over any type of one or more communication links, such as the Internet and/or other packet data networks. The program code 104 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 104 may be transmitted from a source computer-readable medium 102 over non-tangible media, such as communications links or wireless transmissions containing the program code 104. Program code 104 may be more or less temporarily or durably stored on any number of intermediate tangible, physical computer-readable devices and media, such as any number of physical buffers, caches, main memory, or data storage components of servers, gateways, network nodes, mobility management entities, or other network assets, en route from its original source medium to computing device 80.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for selecting components for a generalized linear model, the method comprising:
   determining, by one or more computing devices, a candidate set of probability distributions, a candidate set of link functions, and a candidate set of predictor variables, based at least in part on a dataset of interest;
   selecting, by the one or more computing devices, a probability distribution from the candidate set of probability distributions and a link function from the candidate set of link functions, based at least in part on the candidate set of predictor variables, wherein selecting the probability distribution is based at least in part on metadata of a target variable in the dataset, wherein the metadata of the target variable comprises a measurement level, a storage type, and a range of the target variable, and wherein selecting the probability distribution and selecting the link function comprises selecting a combination of a probability distribution and a link function that performs best among two or more combinations of a probability distribution and a link function based on a performance measure;
   selecting, by the one or more computing devices, one or more predictor variables from the candidate set of predictor variables, based at least in part on the selected probability distribution and the selected link function;
   repeating, by the one or more computing devices, in response to determining that a stopping criterion is not fulfilled, the selecting to select a subsequent probability distribution from the candidate set of probability distributions and a subsequent link function from the candidate set of link functions based at least in part on a currently selected set of predictor variables, and to select one or more subsequent predictor variables from the candidate set of predictor variables based at least in part on a currently selected probability distribution and link function, wherein the stopping criterion comprises a determination that the selected probability distribution, link function, and set of predictor variables in a current iteration is the same as in a previous iteration; and
   generating, by the one or more computing devices, in response to determining that the stopping criterion is fulfilled, a generalized linear model output comprising the selected probability distribution, the selected link function, and the selected one or more predictor variables.

2. The method of claim 1, wherein the performance measure comprises a measure of an average square error (ASE).

3. The method of claim 1, further comprising:
   dividing data from the dataset of interest into a training dataset and a testing dataset;

selecting the performance measure based on the testing dataset; and using the training dataset to compare each of the two or more combinations of the distributions and the link functions with the given set of predictor variables to select the combination of a probability distribution and a link function that performs best among the two or more combinations of a probability distribution and a link function based on the performance measure.

4. The method of claim 1, wherein selecting the distribution comprises selecting from among two or more of: a normal distribution, a Bernoulli distribution, a binomial distribution, a Poisson distribution, an ordinal multinomial distribution, a gamma distribution, an inverse Gaussian distribution, and a negative binomial distribution.

5. The method of claim 1, wherein selecting the probability distribution comprises one or more of:

selecting from among a normal distribution, an inverse Gaussian distribution, and a gamma distribution in response to determining that the dataset has continuous measurement level, real storage type, and positive range;

selecting a normal distribution in response to determining that the dataset has continuous measurement level, real storage type, and non-negative range;

selecting from among a normal distribution, an inverse Gaussian distribution, a gamma distribution, a Poisson distribution, a negative binomial distribution, and a binomial distribution in response to determining that the dataset has continuous measurement level, integer storage type, and positive range;

selecting from among a normal distribution, a Poisson distribution, a negative binomial distribution, and a binomial distribution in response to determining that the dataset has continuous measurement level, integer storage type, and non-negative range;

selecting a Bernoulli distribution in response to determining that the dataset has ordinal measurement level, string storage type or numeric storage type, and two levels of range; and selecting an ordinal multinomial distribution in response to determining that the dataset has ordinal measurement level, string/numeric storage type, and more than two levels of range.

6. The method of claim 1, wherein selecting the link function comprises selecting from among two or more of: an identity link function, a logarithm (log) link function, a logarithm of the odds (log it) link function, a probability unit (probit) link function, a complementary log-log link function, a negative binomial link function, a cumulative log it link function, a cumulative probit link function, a cumulative complementary log-log link function, and a power (a) link function (where a is a real number).

7. The method of claim 1, wherein selecting the link function comprises selecting from among one or more of a number of link functions from a ranked list of link functions corresponding to the selected probability distribution, wherein the number of link functions from the ranked list of link functions is based on a configuration setting that indicates speed versus breadth.

8. The method of claim 1, wherein selecting the link function comprises one or more of:

selecting from among an identity link function, a log link function, or a power (0.5) link function in combination with a normal distribution;

selecting from among an identity link function, a log link function, or a power (−2) link function in combination with an inverse Gaussian distribution;

selecting from among an identity link function, a log link function, or a power (−1) link function in combination with a gamma distribution;

selecting from among an identity link function, a log link function, or a negative binomial link function in combination with a negative binomial distribution;

selecting from among an identity link function, a log link function, or a power (0.5) link function in combination with a Poisson distribution;

selecting from among a log it link function, a probit link function, or a complementary log-log link function in combination with a binomial distribution;

selecting from among a log it link function, a probit link function, or a complementary log-log link function in combination with a Bernoulli distribution; or selecting from among a cumulative log it link function, a cumulative probit link function, or a cumulative complementary log-log link function in combination with an ordinal multinomial distribution.

9. The method of claim 1, further comprising:

determining that the dataset of interest is above a selected threshold; and selecting a random sample of the dataset of interest, wherein determining the candidate set of probability distributions, the candidate set of link functions, and the candidate set of predictor variables based at least in part on the dataset of interest, selecting the probability distribution and link function, selecting the one or more predictor variables, repeating the selecting of the probability distribution and link function and the selecting the one or more predictor variables in response to the stopping criterion not being fulfilled, and generating the generalized linear model output in response to the stopping criterion being fulfilled, are done based on the random sample of the dataset of interest.

10. A computer system for selecting components for a generalized linear model, the computer system comprising:

one or more processors, one or more computer-readable memories, and one or more computer-readable, tangible storage devices;

program instructions, stored on at least one of the one or more storage devices for execution by at least one of the one or more processors via at least one of the one or more memories, to determine a candidate set of probability distributions, a candidate set of link functions, and a candidate set of predictor variables, based at least in part on a dataset of interest;

program instructions, stored on at least one of the one or more storage devices for execution by at least one of the one or more processors via at least one of the one or more memories, to select a probability distribution from the candidate set of probability distributions and a link function from the candidate set of link functions, based at least in part on the candidate set of predictor variables selecting, by the one or more computing devices, a probability distribution from the candidate set of probability distributions and a link function from the candidate set of link functions, based at least in part on the candidate set of predictor variables, wherein to select the probability distribution is based at least in part on metadata of a target variable in the dataset, wherein the metadata of the target variable comprises a measurement level, a storage type, and a range of the target variable, and wherein selecting the probability distribution and the link function comprises selecting a combination of the probability distribution from the candidate set of probability distributions and the link function from the candidate set of link functions;

program instructions, stored on at least one of the one or more storage devices for execution by at least one of the one or more processors via at least one of the one or more memories, to select one or more predictor variables from the candidate set of predictor variables, based at least in part on the selected probability distribution and the selected link function;

program instructions, stored on at least one of the one or more storage devices for execution by at least one of the one or more processors via at least one of the one or more memories, to repeat, in response to determining that a stopping criterion is not fulfilled, the selecting to select a subsequent probability distribution from the candidate set of probability distributions and a link function from the candidate set of link functions based at least in part on a currently selected set of predictor variables, and to select one or more subsequent predictor variables from the candidate set of predictor variables based at least in part on a currently selected probability distribution and link function, wherein the stopping criterion comprises a determination that the selected probability distribution, link function, and set of predictor variables in a current iteration is the same as in a previous iteration; and program instructions, stored on at least one of the one or more storage devices for execution by at least one of the one or more processors via at least one of the one or more memories, to generate, in response to determining that the stopping criterion is fulfilled, a generalized linear model output comprising the selected probability distribution, the selected link function, and the selected one or more predictor variables.

11. A computer program product for selecting components for a generalized linear model, the computer program product comprising a non-transitory computer-readable storage medium having program instructions embodied therewith, the program instructions executable by a computing device to:

determine a candidate set of probability distributions, a candidate set of link functions, and a candidate set of predictor variables, based at least in part on a dataset of interest;

select a probability distribution from the candidate set of probability distributions and a link function from the candidate set of link functions, based at least in part on the candidate set of predictor variables, wherein to select the probability distribution is based at least in part on metadata of a target variable in the dataset, wherein the metadata of the target variable comprises a measurement level, a storage type, and a range of the target variable, and wherein to select the probability distribution and the link function comprises a selection of a combination of the probability distribution from the candidate set of probability distributions and the link function from the candidate set of link functions;

select one or more predictor variables from the candidate set of predictor variables, based at least in part on the selected probability distribution and the selected link function;

repeat, in response to determining that a stopping criterion is not fulfilled, the selecting to select a subsequent probability distribution from the candidate set of probability distributions and a subsequent link function from the candidate set of link functions based at least in part on a currently selected set of predictor variables, and to select one or more subsequent predictor variables from the candidate set of predictor variables based at least in part on a currently selected probability distribution and link function, wherein the stopping criterion comprises a determination that the selected probability distribution, link function, and set of predictor variables in a current iteration is the same as in a previous iteration; and generate, in response to determining that the stopping criterion is fulfilled, a generalized linear model output comprising the selected probability distribution, the selected link function, and the selected one or more predictor variables.

* * * * *